US006711159B1

(12) United States Patent
Grabelsky et al.

(10) Patent No.: US 6,711,159 B1
(45) Date of Patent: Mar. 23, 2004

(54) LOAD BALANCING AMONG MEDIA GATEWAYS

(75) Inventors: David A. Grabelsky, Skokie, IL (US); Michael S. Borella, Naperville, IL (US); Sudhakar Ramakrishna, Mt. Prospect, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/464,527

(22) Filed: Dec. 15, 1999

(51) Int. Cl.[7] .................. H04L 12/66; H04L 12/28; H04J 3/16
(52) U.S. Cl. ............. 370/353; 370/401; 370/465; 379/219; 379/88.17; 709/249
(58) Field of Search ................. 370/217, 230, 370/252, 352, 354, 353, 396, 400, 401, 402, 410, 465, 466, 467; 375/222; 709/105, 249, 239; 379/221.1, 221.09, 221.12, 88.17, 93.15

(56) References Cited

U.S. PATENT DOCUMENTS

| 5,371,852 | A | | 12/1994 | Attanasio et al. | ............ 395/200 |
| 5,546,379 | A | * | 8/1996 | Thaweethai et al. | .......... 370/17 |
| 5,774,668 | A | | 6/1998 | Choquier et al. | ....... 395/200.53 |
| 5,862,348 | A | | 1/1999 | Pedersen | ............... 395/200.59 |
| 5,983,281 | A | | 11/1999 | Ogle et al. | ................... 709/249 |
| 6,393,483 | B1 | * | 5/2002 | Latif et al. | .................. 709/226 |
| 6,404,736 | B1 | * | 6/2002 | Arkko et al. | ............... 370/230 |
| 6,434,140 | B1 | * | 8/2002 | Barany et al. | .............. 370/352 |
| 6,493,341 | B1 | * | 12/2002 | Datta et al. | ................ 370/392 |

OTHER PUBLICATIONS

Information Sciences Institute, Internet Engineering Task Force ("IETF"), Request for Comments ("RFC") RFC–791 "Internet Protocol," Sep. 1981, pp. 1–45.

International Telecommunication Union (ITU–T), Recommendation H.323, "Packet Based Multimedia Communications Systems," Sep. 1997, pp. 1–119.

H. Schulzrinne, S. Casner, R. Frederick, V. Jacobson, Internet Engineering Task Force ("IETF"), Request for Comments (RFC) RFC–1889, "RTP: A Transport Protocol for Real–Time Applications," Jan. 1996, pp. 1–75.

M. Handley, H. Schulzrinne, E. Schooler, J. Rosenberg, Internet Engineering Task Force ("IETF") Request for Comments 2543, "SIP: Session Initiation Protocol," Mar. 1999, pp. 1–153.

* cited by examiner

Primary Examiner—Duc Ho
(74) Attorney, Agent, or Firm—McDonnell Boehnen Hulbert & Berghoff

(57) ABSTRACT

A telephony system and method having a switch for analog voice and data signals that is connected to a first network, and a router for routing Internet Protocol packets that is connected to a second network using Internet Protocol addressing. The telephony system and method also includes a telephony gateway that is connected to both the switch and the router for converting analog voice signals into Internet Protocol packets and for converting Internet Protocol packets into analog voice signals, the telephony gateway being connected, and a remote access server that is connected to both the switch and the router for converting analog data signals into Internet Protocol packets and for converting Internet Protocol packets into analog data signals. The switch may have a switch matrix capable of being connected to the Public Switched Telephone Network, a line rack with a plurality of line cards connected to the switch matrix, and a trunk rack with a plurality of trunk cards connected to the switch matrix. The switch matrix may also be connected to the telephony gateway and the remote access server.

26 Claims, 7 Drawing Sheets

LOAD BALANCING AMONG MEDIA GATEWAYS

FIELD OF INVENTION

This invention relates to Internet telephony and its interworking with the legacy Public Switched Telephone Network ("PSTN"). More specifically, it relates to a system and method for balancing the load among Internet Telephony Gateways connected to the PSTN.

BACKGROUND OF THE INVENTION

Internet telephony encompasses a number of technologies for the transport of voice traffic over Internet Protocol ("IP") networks. At a very high level, IP telephony can be divided into a media portion or plane, and a signaling and call control portion or plane. The media plane provides functionality required for media transport, such as packetization of voice data, packet delivery, and media playout at the destination. The signaling plane provides functionality required to set up, tear down, and manage calls.

An important aspect of Internet Telephony is the interworking of the IP network with the existing PSTN. In the context of PSTN inter-working, the media and signaling planes include expanded functionality in order to connect different types of networks. Thus, the media plane incorporates components that translate and map the voice data between the circuit-switched PSTN and the packet-switched IP network, enabling it to act as a gateway between the two different kinds of media transport. Similarly, the signaling and call control plane incorporates components that translate and map signaling and call control protocols between the PSTN and the IP networks, in order to set up, tear down, and manage calls which traverse both types of networks.

The development of common protocols and architectures for the PSTN inter-working function is a major focus of several standards groups, including the Internet Engineering Task Force ("IETF") and the International Telecommunications Union ("ITU"). While this is a large task, requiring the resolution of many technical issues, a general architecture has emerged in which the media plane and signaling and call control plane are viewed as distinct elements. The media plane component is commonly referred to as an Internet Telephony Gateway ("ITG"), or more generally as a Media Gateway ("MG"). The signaling and call control plane component is further divided into two elements. One element both controls the MG remotely, and handles IP-side signaling and call control with peer elements on the IP network. This element is called the Media Gateway Controller ("MGC"). The other element provides the mapping and translation between the PSTN and IP signaling and call control protocols. This element is called the Signaling Gateway ("SG"). The MGC and MG are usually configured in a master (MGC) and slave (MG) relationship, and multiple MGs may be under the control of a single MGC. Additionally, the MGC and MG may be combined in the same device, or alternatively, separate devices remote from each other.

For a call that traverses an IP network and terminates on the PSTN, the ITG that provides the gateway function to complete the call is commonly termed the egress gateway. For any given call with an IP-to-PSTN leg, it may be the case that more than one egress gateway is available. This could occur if the protocol used to set up the call has identified multiple, candidate egress gateways, each with appropriate network connectivity to the desired (egress) Local Exchange Carrier ("LEC"). For example, if multiple ITGs are clustered under MGs in a hierarchical fashion, so as to appear to the system as large virtual ITGs, the identification of several alternative egress gateways will be a common occurrence. Under such circumstances, it will generally be very desirable to have a method to achieve a balance of handled calls among the egress gateways in order to optimize usage of the collective ITG resources. This is important for overall system performance, as well as to avoid subjecting a disproportionately large number of calls to possible interruption in the event of ITG failure. It will also generally be very desirable under such circumstances to provide load balancing that is distributed, rather than controlled and maintained by a central MGC or ITG, to help prevent traffic bottle necks.

Accordingly, it is desirable to provide a system and method for achieving load balancing among egress MGs, such as ITGs, without resorting to centralized control or the attendant need for centralized port management and state maintenance. By balancing the load among egress MGs, calls can be distributed roughly uniformly among available egress MGs to preserve MG resources and optimize overall system performance. In addition, by distributing the load balancing without resorting to centralized control and maintenance, potential traffic bottle necks at a central controller can be avoided.

SUMMARY OF THE INVENTION

The present invention provides a method for load balancing among gateway devices comprising the steps of: obtaining a list of a plurality of gateway devices, and sending a request to a first gateway device on the list. The method also comprises the steps of determining whether the first gateway device has an available port, removing the first gateway device from the list if the first gateway device does not have an available port, and sending the request to a second gateway device on the list if the first gateway device does not have an available port. The method further comprises the steps of determining whether the request should be accepted by the first gateway device if the first gateway device has an available port, selecting the available port of the first gateway device if the request is accepted, and sending the request to a second gateway device on the list if the request is not accepted by the first gateway device.

The present invention also provides a method for load balancing among gateway devices used to complete calls between a first network and a second network. The method comprises the steps of obtaining a list of a plurality of gateway devices that are candidates for completing a call between the first and second networks, and sending a request to a first gateway device on the list, with the request including the list. The method further comprises the steps of determining whether the first gateway device has an available port to complete the call, removing the first gateway device from the list if the first gateway device does not have an available port, and sending the request to a second gateway device on the list if the first gateway device does not have an available port. In addition, the method comprises the steps of determining whether the request should be accepted by the first gateway device if the first gateway device has an available port, selecting the available port of the first gateway device if the request is accepted, and completing the call using the available port of the first gateway device if the request is accepted. The method also comprises the steps of assigning a cost value for completing the call to the first gateway device if the request is not accepted by the first gateway device, and sending the request to a second gateway device on the list if the request is not accepted by the first gateway device.

Moreover, the present invention provides a system for balancing the load among gateway devices comprising a list of a plurality of gateway devices that are candidates for completing a call between a first and a second network. The system also comprises a first gateway device positioned first on the list and in communication with the first and second networks, and a second gateway device positioned second on the list and in communication with the first and second networks. Both the first and second gateway devices also each have at least one port. The system further comprises a request including the list, with the request capable of being sent to the first and second gateway devices. In addition, the system comprises a first decision algorithm to determine whether the first gateway device has an available port to complete the call, and a second decision algorithm to determine whether the request should be accepted by the first gateway device if the first gateway device has an available port.

DETAILED DESCRIPTION OF AN ILLUSTRATIVE EMBODIMENT

Figure 1:
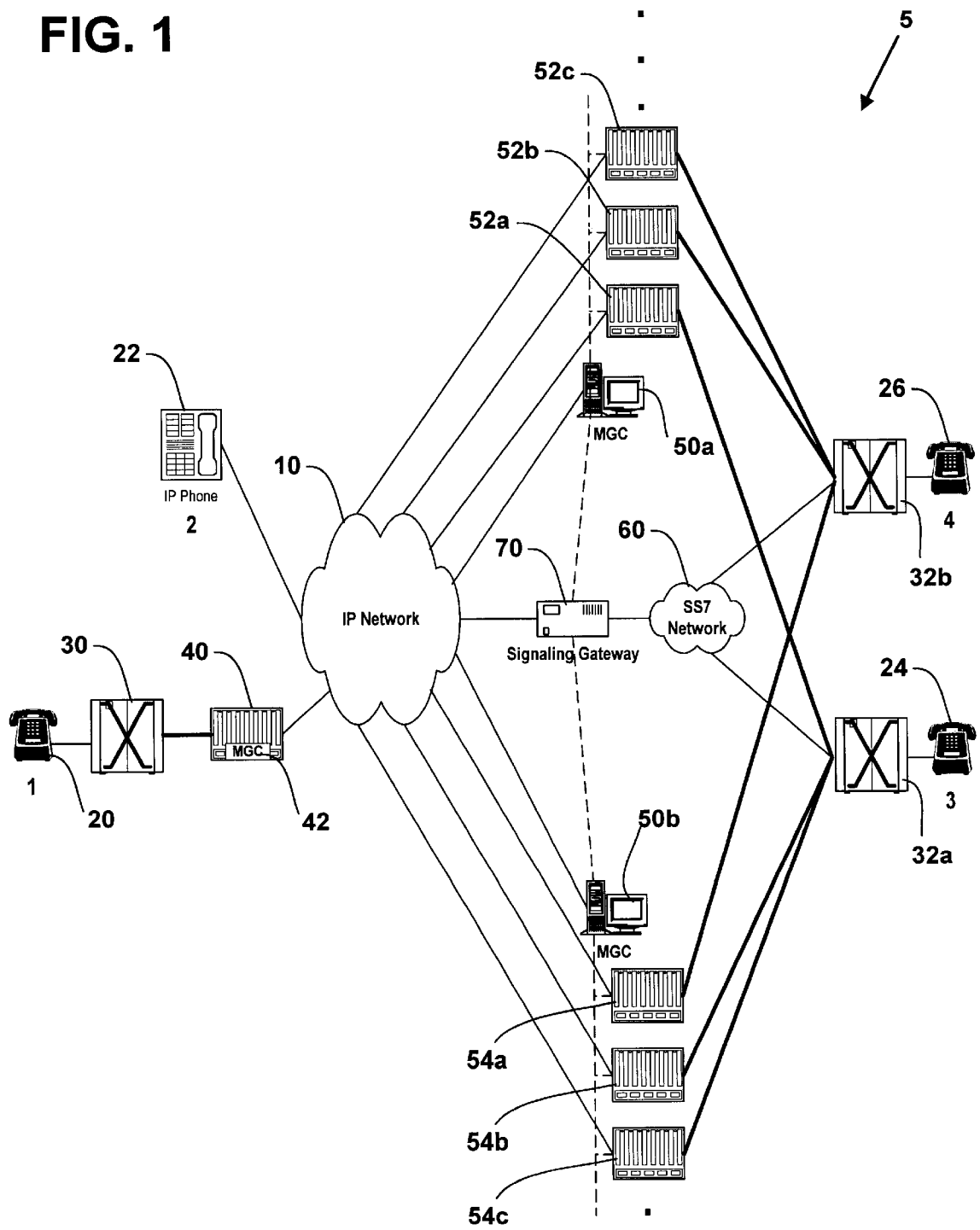
FIG. 1 is a block diagram illustrating a general architecture for a load balancing system of the present invention, with solid lines indicating physical connections, and dashed lines indicating logical connections.

FIG. 1 is a block diagram illustrating a general architecture for a load balancing system 5 of the present invention. This load balancing system 5 comprises on one side an IP network 10 that uses IP packets to transmit information between network users. For more information on IP, see IETF Request For Comments ("RFC") RFC-791, specifically incorporated herein by reference. One or more media sources or network calling devices, such as a first and a second media device 20, 22, may be connected to the IP network 10. For example, the first media device 20 may be an analog telephone, and the second media device 22 may be an IP telephone. As an analog telephone, the first media device 20 may be connected, either directly or indirectly through a first switch 30, to a Media Gateway ("MG") 40, which is in turn connected to the IP network 10, as shown in FIG. 1. In contrast, since the second media device 22 preferably uses IP packets to transmit information, the second media device 22 is connected directly to the IP network 10.

Preferably, but necessarily, the MG 40 is an Internet Telephony Gateway ("ITG") that converts analog voice calls or video signals (i.e., the real-time data) from the first media device 20 (or similar device) into Real Time Protocol ("RTP") IP packets for the IP network 10, and that also converts RTP IP packets from the IP network 10 into analog voice calls or video signals (i.e., the real-time data) for the first media device 20 (or similar device). For more information on RTP, see RFC-1889, specifically incorporated herein by reference. Alternatively, the MG 40 may be another type of media gateway, such as a modem Remote Access Server ("RAS"), that converts analog modem calls from the first media device 20 (or more precisely, a computer modem hooked up to the first media device) into digital IP packets for the IP network 10, and that converts digital IP packets from the IP network 10 into analog modem calls for the first media device 20 (or more precisely, a computer modem hooked up to the first media device).

As shown in FIG. 1, the MG 40 has an integral Media Gateway Controller ("MGC") 42 that signals and controls the MG 40. As a result, the MG 40 may be referred to as an intelligent MG. Preferably, but not necessarily, the MGC 42 uses the well-known Media Gateway Control Protocol ("MGCP") to communicate with and control the MG 40. It should also be understood, that while the MG 40 and the MGC 42 are shown in FIG. 1 as an integral device, the MG 40 and the MGC 42 may be separated from each other, with the MGC 42 controlling the MG 40 remotely.

The IP network 10 is also connected to a plurality of MGs 52a, 52b, 52c, 54a, 54b, 54c, each of which may be either an ITG or a modem RAS like MG 40. The MGs 52a, 52b, 52c, 54a, 54b, 54c are also connected through the IP network 10 to, and controlled by, a first and a second MGC 50a, 50b. Preferably, the MGs 52a, 52b, 52c are connected through the IP network 10 to, and controlled by, the MGC 50a, while the MGs 54a, 54b, 54c are connected through the IP network 10 to, and controlled by, the MGC 50b. Each MGC 50a, 50b is also connected to the IP network 10, and preferably, but not necessarily, uses MGCP to communicate with and control its respective MGs. As indicated by the dots in FIG. 1, it should be understood that there may be more than the six MGs 52a, 52b, 52c, 54a, 54b, 54c in the system 5 of the present invention, and only these six MGs are shown in FIG. 1 for ease of illustration. Likewise, there may be more than the two MGCs 50a, 50b in the system 5 of the present invention, and only two MGCs are shown in FIG. 1 for ease of illustration. It should also be understood, that while the MGCs are shown in FIG. 1 as separate devices from the MGs, the MGCs 50a, 50b may be incorporated into a single device with their respective MGs 52a, 52b, 52c, 54a, 54b, 54c like the arrangement between the MG 40 and the MGC 42 (i.e., intelligent MGs).

On the other side of the system 5 is the PSTN, which uses circuit-based switching instead of packet-based switching like the IP network 10. The PSTN is represented by the second and third switches 32a, 32b and their respective third and fourth media devices 24, 26, which are preferably analog telephones similar to the first media device 20. As shown in FIG. 1, each of the second and third switches 32a, 32b, and thus each of the third and fourth media devices 24, 26, is connected to an SS7 network 60 that centrally administers the PSTN with a protocol for out-of-band control and signaling, known as Signaling System 7 ("SS7") (see, e.g., T. Russell, *Signaling System #7* (2d. Ed.), McGraw-Hill, 1998). The SS7 network 60 relies on SS7 to perform call setup, management and teardown, database services, and supplementary services, such as call forwarding, caller ID, and ringback. The SS7 network 60 preferably has three types of nodes: (1) service switching points ("SSPs"); (2) service transfer points ("STPs"); and (3) service control points ("SCPs"). Although not shown, SSPs are SS7 switches that are connected to the second and third switches 32a, 32b for ingress and egress access to the SS7 network 60. In addition, STPs are packet switches that forward and route SS7 messages within the SS7 network 60, and connect SSPs with other SSPs, as well as with SCPs. SCPs are distributed telephony databases that contain customer profiles, E.164 mappings, and call record information.

The SS7 network 60 is also connected to a Signaling Gateway ("SG") 70, which in turn is connected to the IP network 10, as well as the MGCs 50a, 50b through the IP network 10. The SG 70 acts as a transporter for, and communicator between, the IP network 10 and the SS7network 60. In one embodiment, the SG 70 may have the ability to encapsulate and transport SS7 messages within IP packets for routing to the MGCs 50a, 50b. Consequently, the MGCs 50a, 50b would then have the ability to translate the SS7 messages into IP signaling protocols for signaling the IP network 10. Suitable examples of IP signaling protocols include H.323 and Session Initiation Protocol ("SIP"). For more information on H.323, see International Telecommunications Union ("ITU") Recommendation H.323, specifically incorporated herein by reference, and for more information on SIP, see RFC-2543, specifically incorporated herein by reference. In this embodiment, the MGCs 50a, 50b would also preferably have the ability to translate IP signaling protocols into SS7 messages, and send the SS7 messages within IP packets to the SG 70 for routing to the SS7 network 60. The SG 70 would then have the ability to remove the SS7 messages from the IP packets and forward the SS7 messages to the SS7 network 60.

As shown in FIG. 1, each of the second and third switches 32a, 32b, and thus each of the third and fourth media devices 24, 26, is also connected to the IP network 10 through the plurality of MGs 52a, 52b, 52c, 54a, 54b, 54c. Preferably, but not necessarily, the second switch 32a and the third media device 24 are connected to the IP network 10 through MGs 52a, 54b, 54c, and the third switch 32b and the fourth media device 26 are connected to the IP network 10 through MGs 52b, 52c, 54a. For ease of reference and illustrative purposes, the call traffic described in the present application initiates on the IP network side, either directly from the second media device 22 (i.e., an IP telephone) or indirectly from the first media device 20 (i.e., an analog telephone) through the first switch 30 and the MG 40, and terminates on the PSTN side. As a result, the MG 40 and its MGC 42 may be referred to hereinafter as an ingress MG and an ingress MGC, respectively, while the MGs 52a, 52b, 52c, 54a, 54b, 54c and their MGCs 50a, 50b may be referred to hereinafter as egress MGs and egress MGCs, respectively. It should be understood, however, that the call traffic for the present invention may also be initiated on the PSTN side, pass through the IP network side, and terminate on the PSTN side. Indeed, the first media device 20, as well as the first switch 30, may be a part of the PSTN.

It should also be understood that the previously described architecture for the load balancing system 5 is merely exemplary, and other configurations may be used for the load balancing system of the present invention, depending on network and user preferences.

Figure 2A:
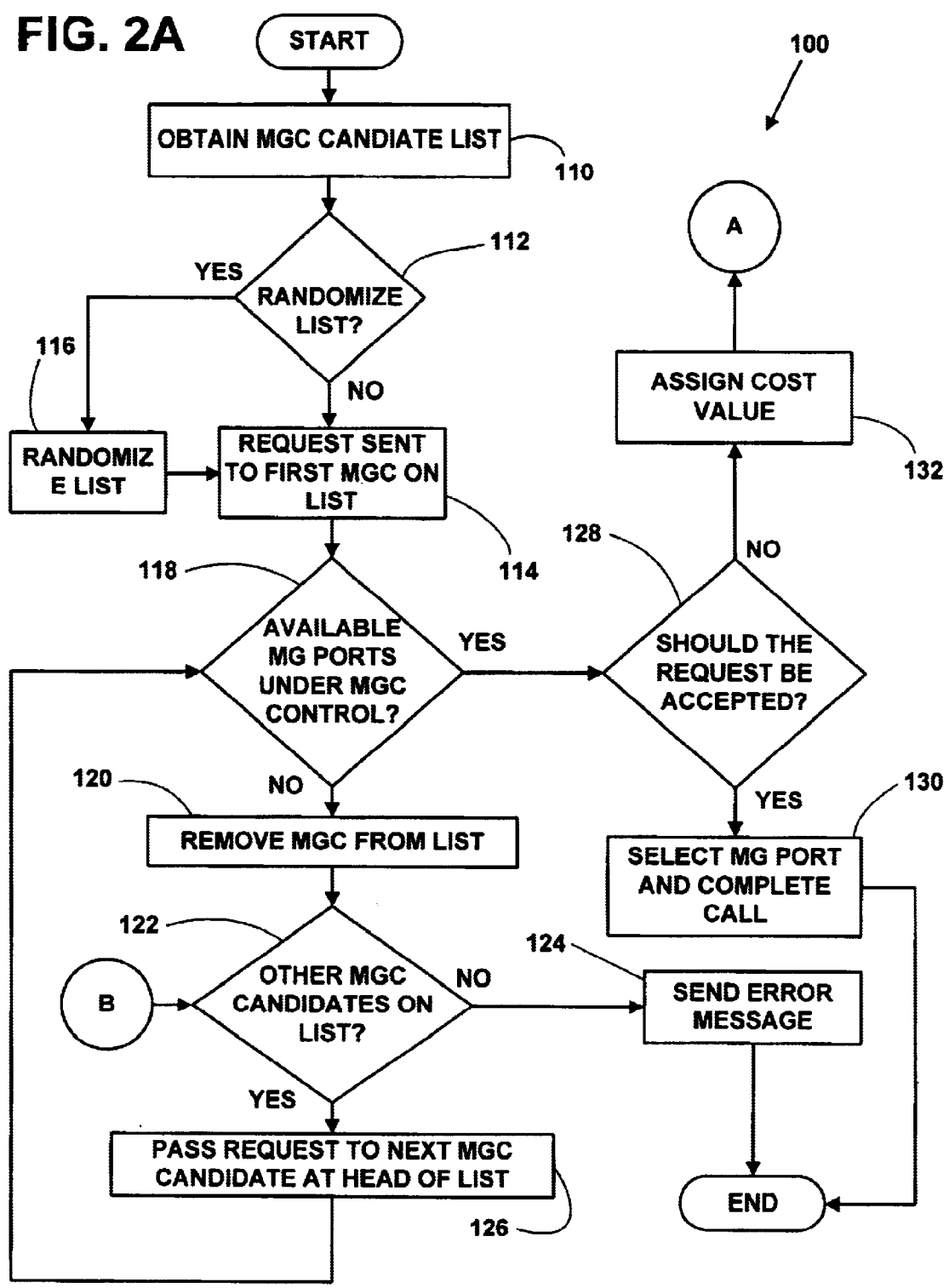
FIG. 2 is a flow diagram illustrating a load balancing method of the present invention among MCGs.
Figure 2B:
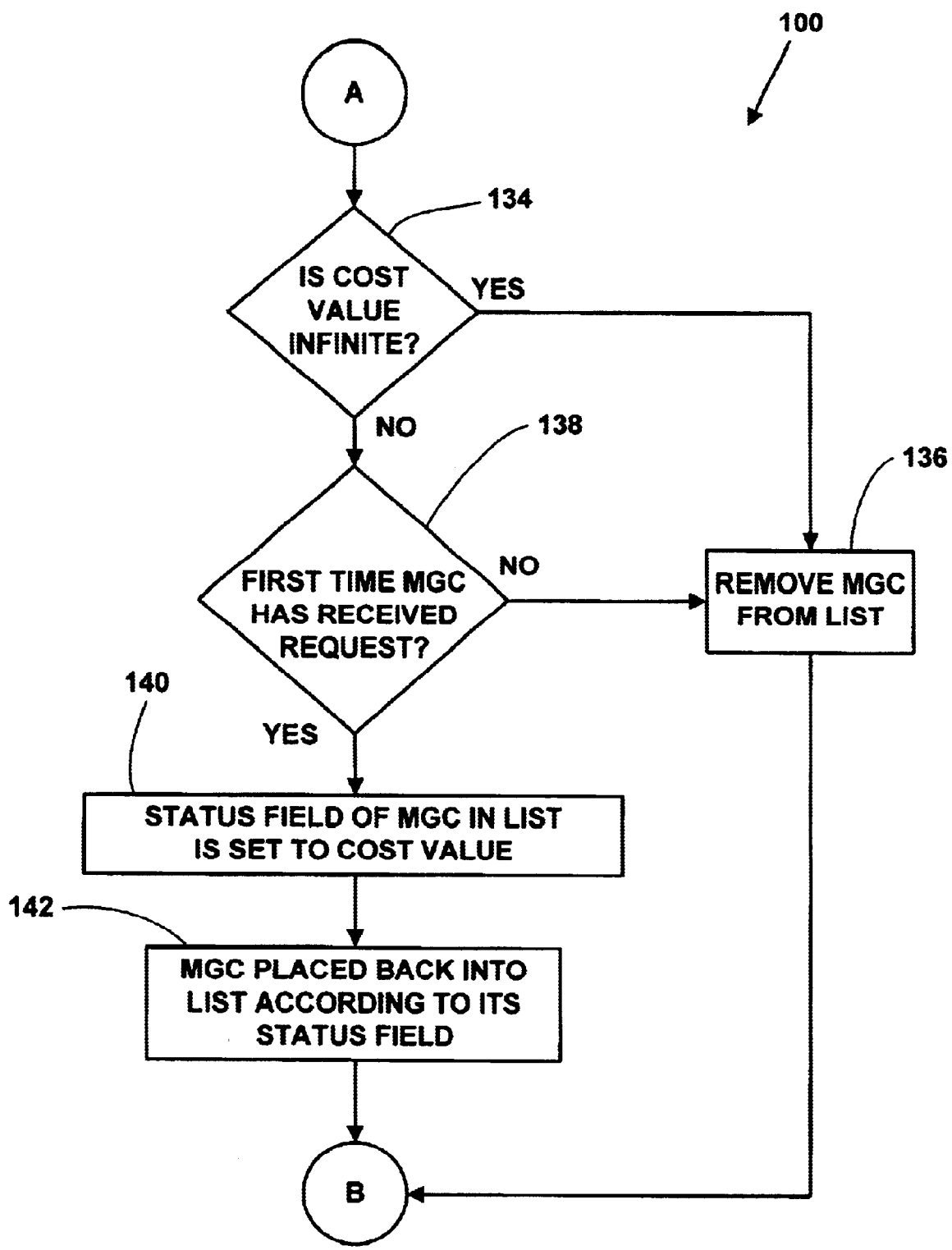

The operation of the system 5 and the load balancing methods of the present invention will now be described with reference to the flow charts shown in FIGS. 2 and 3. When an IP media source, such as the ingress MG 40, its MGC 42, or the second media device 22, wants to open a media connection to an egress MG, such as MG 52a, 52b, 52c, 54a, 54b, 54c, in order to complete an IP-to-PSTN call leg (or any other call leg requiring an egress MG), the media source first obtains a list of either candidate egress MGCs or candidate egress MGs. The methods differ slightly depending on the type of list obtained. FIG. 2 shows the first method 100 of the present invention, which begins with the ingress MG 40 or its MGC 42 obtaining an MGC list 300 of candidate egress MGCs in Step 110. A preferred format for the MGC list 300 is described in more detail below and shown in FIG. 4A. The MGC list 300 may be obtained by the ingress MG 40 or its MGC 42 in a number of different ways, depending on network and user preferences. For instance, the ingress MG 40 or its MGC 42 may obtain the MGC list from a backend services directory of the IP network 10 that maps destination IP addresses or phone numbers into a list of candidate egress MGCs. Alternatively, the ingress MG 40 or its MGC 42 may, via the SG 70, obtain the MGC list from customized SS7/SCP services of the SS7 network 60 that map destination IP addresses or phone numbers into a list of candidate egress MGCs.

In addition, the MGC list that is obtained by the ingress MG 40 or its MGC 42 may or may not be prioritized. For example, an egress MG that minimizes the number of remaining call legs could be the basis for prioritization. Such prioritization of the MGC list may be used to implement policy into the load balancing system.

In the next Step 112 of the method 100, a determination is made of whether or not the MGC list 300 and its entries should be randomized. If the MGC list is prioritized, then the MGC list should not be randomized, and a request 500 containing the MGC list 300 is sent in Step 114 directly to the first egress MGC (i.e., either MGC 50a or 50b) entry on the MGC list. A preferred format for the request 500 is described in more detail below and shown in FIG. 5. Alternatively, however, the MGC list and its entries may be randomized in Step 116 before sending the request with the MGC list in Step 114. It should be understood that randomization of the list itself is a form of policy, which strives to achieve a statistically balanced load. However, any deliberate orderings of the list may be used to obtain other different forms of the load distribution among egress MGs.

When the candidate egress MGC (i.e., either MGC 50a or 50b) receives the request 500, the MGC necessarily finds the MGC list entry corresponding to itself at the head of the MGC list. A first decision algorithm is then applied beginning with Step 118. In Step 118, the candidate egress MGC that received the request uses MGCP (or some other similar protocol) to query all of the appropriate MGs under its control (i.e., those MGs that can complete the call leg on the PSTN side) for a list of available or free physical MG ports. For example, if a call was being placed from the second media device 22 to the fourth media device 26 using the MGC 50a, the MGs 52b and 52c would be queried by the MGC 50a for available ports. The candidate MGC that received the request may query its MGs each time it receives a request, or alternatively, may simply maintain state of its MGs, which it updates using a protocol such as MGCP.

Once the MGC receives replies from all of its queried MGs, the MGC determines if there are any free ports from among them. If there are no free ports, then the MGC removes itself from the MGC list in Step 120, and makes a determination as to whether there are still candidate egress MGC entries on the MGC list in Step 122. If there are no further candidate egress MGC entries on the MGC list, an error message is returned in Step 124 to the originating IP media source (i.e., the ingress MG 40, its MGC 42, or the second media device 22) advising of no available ports. On the other hand, if there are other candidate egress MGC entries on the MGC list, then the request is forwarded to the next candidate egress MGC (now at the head of the MGC list), and the first decision algorithm returns to Step 118 for the new MGC recipient of the request. This completes the first decision algorithm for the case of no available ports with respect to a given candidate egress MGC.

If there are available ports under the control of the candidate MGC that received the request, a second decision algorithm is applied beginning with Step 128. In Step 128, a determination is made as to whether the request should be accepted by the MGC. If the request is accepted, the MGC selects the available MG port and completes the call using the selected MG port in Step 130. More specifically, the MGC instructs its MG with the available port to reserve the selected port for the call, and the required signaling to complete call setup proceeds. This call completion process is well known in the art and generally involves the SG 70 to handle the PSTN side of the signaling, and the selected egress candidate MGC to complete the IP side of the signaling. The call completion process also usually includes informing the originating media source of the IP address of the selected egress MG, and the port number being used on that MG. Depending on the IP signaling protocol being used, the IP address of the egress MGC controlling the selected MG may also be reported back to the originating media source. For the case of the request being accepted, the second decision algorithm is completed with Step 130.

If the request is not accepted in Step 128, however, then a cost value is assigned to the request by the rejecting egress MGC in Step 132. Preferably, the cost value indicates the cost for forcing acceptance of the request and the call. The cost value may take the form of a probability function applied to the number of available MG ports, and/or perhaps the number of previous iterations through the MGC list 300 that have resulted in rejections of the request. For example, if the MG ports under the control of the MGC were eighty percent (or 0.8) utilized, then the cost value may be set at eighty percent (or 0.8). In addition, a threshold to the number of iterations through the MGC list could be applied such that, if an MGC with even only one available MG port finds that the threshold has been reached, then the MGC allocates that free MG port. Alternatively, a maximum port utilization that is below the actual system capacity could be enforced by not applying any threshold. When a maximum utilization threshold is strictly enforced, then the cost value is preferably infinite, indicating strict unavailability of a port.

As shown in FIG. 2, a determination is then preferably made in Step 134 as to whether the cost value assigned is infinite. If the cost value is infinite, then the rejecting egress MGC removes itself from the MGC list in Step 136, and the method 100 continues to Step 122, which is explained above. In contrast, if the cost value is not infinite, another determination is preferably made in Step 138 as to whether this is the first time that the rejecting egress MGC has received or seen the request. If this is the first time that the rejecting egress MGC has received or seen the request, then the status field of the MGC list entry corresponding to the rejecting egress MGC is set to equal the cost value in Step 140. The status field is described in more detail below and shown in FIGS. 4A. Next, in Step 142, the rejecting egress MGC places its corresponding entry back into the MGC list according to the value in its status field (i.e., the cost value). Preferably, the higher the value of a status field (or cost value), the farther the entry is placed from the top of the MGC list. After the rejecting egress MGC places its entry back into the MGC list, the method 100 continues with Step 122, which is explained above.

The rejecting egress MGC knows whether or not it has received or seen the request before by examining the value of the status field of the MGC list entry corresponding to the MGC. If the status field is set equal to the initial default value of zero (see below), then the MGC has not received or seen the request before, and this is the first time that the MGC has received or seen the request. On the contrary, if the value of the status field is not equal to the initial default value of zero (see below), then the MGC has received or seen the request before. If the rejecting egress MGC has received or seen the request before, and thus is now rejecting the request for a second time, the method proceeds to Step 136, which is explained above. For the case of the request not being accepted, the second decision algorithm is completed with either Step 136 or Step 142.

Figure 3A:
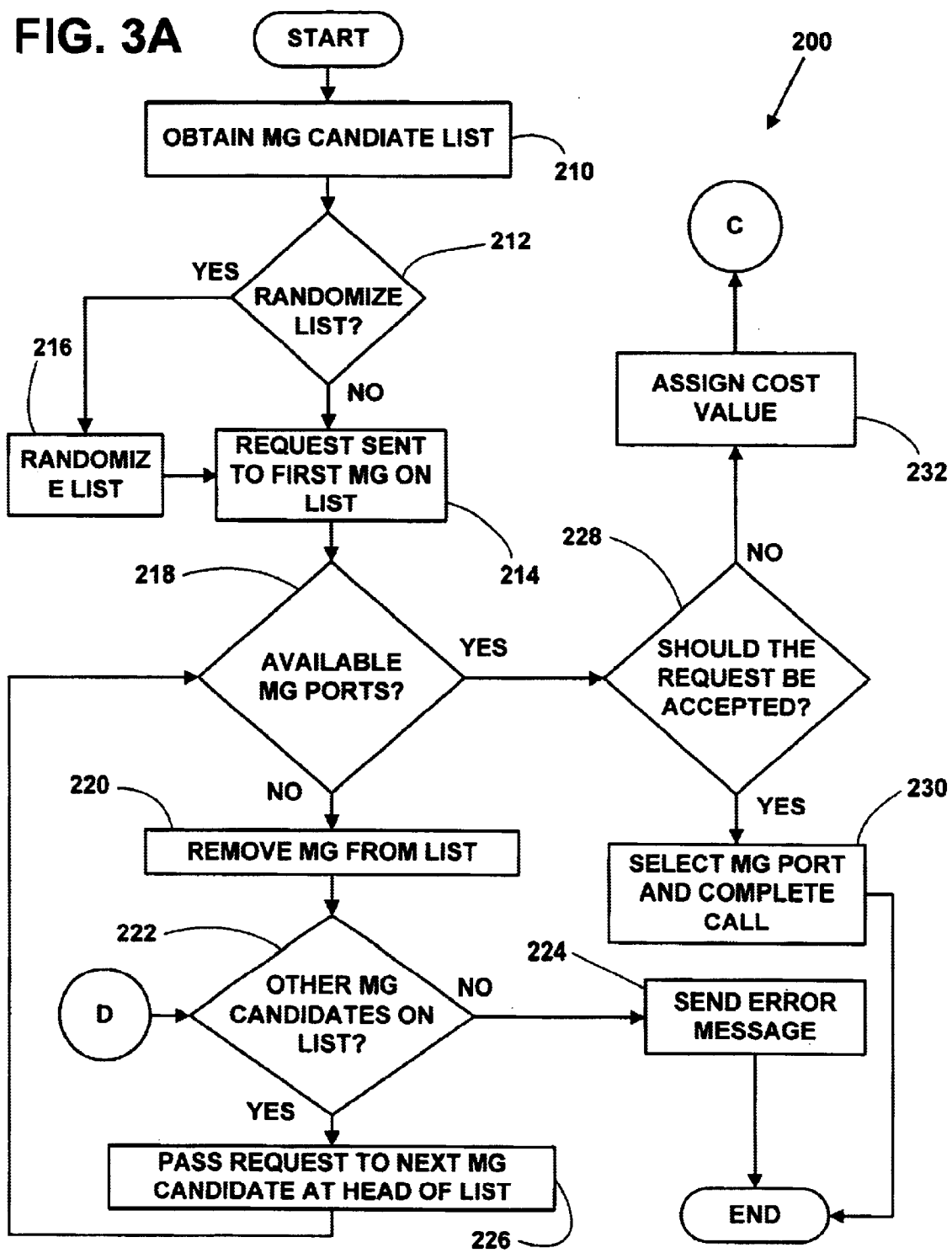
FIG. 3 is a flow diagram illustrating a load balancing method of the present invention among MGs.
Figure 3B:
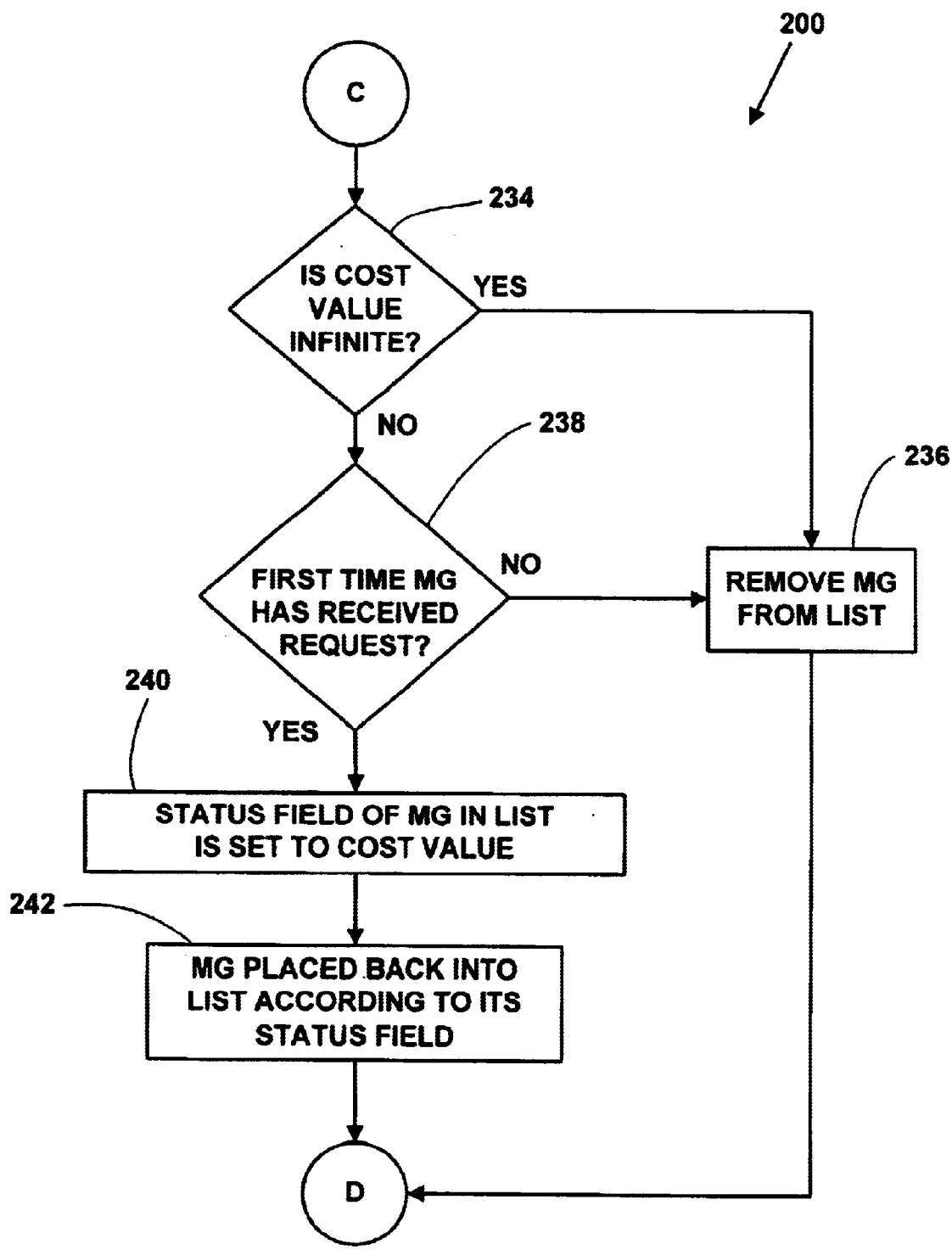

The second method 200 shown in FIG. 3 is nearly identical to the first method 100, except that in second method 200, the candidates, lists, and requests involve the MGs directly, rather than indirectly through the MGCs. This second method 200 is particularly useful with intelligent MGs that have integral, rather than separate, MGCs, but certainly does not require intelligent MGs. The second method 200 of the present invention begins with the ingress MG 40 or its MGC 42 obtaining an MG list 400 of candidate egress MGs in Step 210. A preferred format for the MG list 400 is described in more detail below and shown in FIG. 4B. As with the first method 100, the MG list 400 may be obtained by the ingress MG 40 or its MGC 42 in a number of different ways, depending on network and user preferences. For instance, the ingress MG 40 or its MGC 42 may obtain the MG list from a backend services directory of the IP network 10 that maps destination IP addresses or phone numbers into a list of candidate egress MGs. Alternatively, the ingress MG 40 or its MGC 42 may, via the SG 70, obtain the MG list from customized SS7/SCP services of the SS7 network 60 that map destination IP addresses or phone numbers into a list of candidate egress MGs.

In addition, the MG list that is obtained by the ingress MG 40 or its MGC 42 may or may not be prioritized. For example, an egress MG that minimizes the number of remaining call legs could be the basis for prioritization. Such prioritization of the MG list may be used to implement policy into the load balancing system.

In the next Step 212 of the method 200, a determination is made of whether or not the MG list 400 and its entries should be randomized. If the MG list is prioritized, then the MG list should not be randomized, and a request 500 containing the MG list 400 is sent in Step 214 directly to the first egress MG (i.e., either MG 52a, 52b, 52c, 54a, 54b, or 54c) entry on the MG list. The preferred format for the request 500 used with the second method 200 is identical to that of the request 500 used with the first method 100, except that the candidate lists are obviously different, as described in more detail below. Alternatively, however, the MG list and its entries may be randomized in Step 216 before sending the request with the MG list in Step 214. As with the first method 100, it should be understood that randomization of the list itself is a form of policy, which strives to achieve a statistically balanced load. Once again, however, any deliberate orderings of the list may be used to obtain other different forms of the load distribution among egress MGs.

When the candidate egress MG (i.e., either MG 52a, 52b, 52c, 54a, 54b, or 54c) receives the request 500, the MG necessarily finds the MG list entry corresponding to itself at the head of the MG list. A first decision algorithm is then applied beginning with Step 218. In Step 218, the candidate egress MG checks itself for any available or free physical ports. If there are no free ports, then the MG removes itself from the MG list in Step 220, and makes a determination as to whether there are still candidate egress MG entries on the MG list in Step 222. If there are no further candidate egress MG entries on the MG list, an error message is returned in Step 224 to the originating IP media source (i.e., the ingress MG 40, its MGC 42, or the second media device 22) advising of no available ports. On the other hand, if there are other candidate egress MG entries on the MG list, then the request is forwarded to the next candidate egress MG (now at the head of the MG list), and the first decision algorithm returns to Step 218 for the new MG recipient of the request. This completes the first decision algorithm for the case of no available ports with respect to a given candidate egress MG.

If the candidate MG that received the request has available ports, a second decision algorithm is applied beginning with Step 228. In Step 228, a determination is made as to whether the request should be accepted by the MG. If the request is accepted, the MG selects the available port and the call is completed using the selected port in Step 230. The call completion process may be the same as set forth above with respect to Step 130 of the first method 100, or alternatively, other call completion processes may be used once the egress MG and port have been identified. For the case of the request being accepted, the second decision algorithm is completed with Step 230.

If the request is not accepted in Step 228, however, then a cost value is assigned to the request by the rejecting egress MG in Step 232. As set forth above, the cost value preferably indicates the cost for forcing acceptance of the request and the call. The cost value may take the form of a probability function applied to the number of available MG ports, and/or perhaps the number of previous iterations through the MG list 400 that have resulted in rejections of the request. For example, if the MG's ports were eighty percent (or 0.8) utilized, then the cost value may be set at eighty percent (or 0.8). In addition, a threshold to the number of iterations through the MG list could be applied such that, if an MG with even only one available port finds that the threshold has been reached, then the MG allocates that free port. Alternatively, a maximum port utilization that is below the actual system capacity could be enforced by not applying any threshold. When a maximum utilization threshold is strictly enforced, then the cost value is preferably infinite, indicating strict unavailability of a port.

As shown in FIG. 3, a determination is then preferably made in Step 234 as to whether the cost value assigned is infinite. If the cost value is infinite, then the rejecting egress MG removes itself from the MG list in Step 236, and the method 200 continues to Step 222, which is explained above. In contrast, if the cost value is not infinite, another determination is preferably made in Step 238 as to whether this is the first time that the rejecting egress MG has received or seen the request. If this is the first time that the rejecting egress MG has received or seen the request, then the status field of the MG list entry corresponding to the rejecting egress MG is set to equal the cost value in Step 240. The status field is described in more detail below and shown in FIG. 4B. Next, in Step 242, the rejecting egress MGC places its corresponding entry back into the MG list according to the value in its status field (i.e., the cost value). Preferably, the higher the value of a status field (or cost value), the farther the entry is placed from the top of the MG list. After the rejecting egress MG places its entry back into the MG list, the method 200 continues with Step 222, which is explained above.

The rejecting egress MG knows whether or not it has received or seen the request before by examining the value of the status field of the MG list entry corresponding to the MG. If the status field is set equal to the initial default value of zero (see below), then the MG has not received or seen the request before, and this is the first time that the MG has received or seen the request. On the contrary, if the value of the status field is not equal to the initial default value of zero (see below), then the MG has received or seen the request before. If the rejecting egress MG has received or seen the request before, and thus is now rejecting the request for a second time, the method proceeds to Step 236, which is explained above. For the case of the request not being accepted, the second decision algorithm is completed with either Step 236 or Step 242.

Figure 4A:
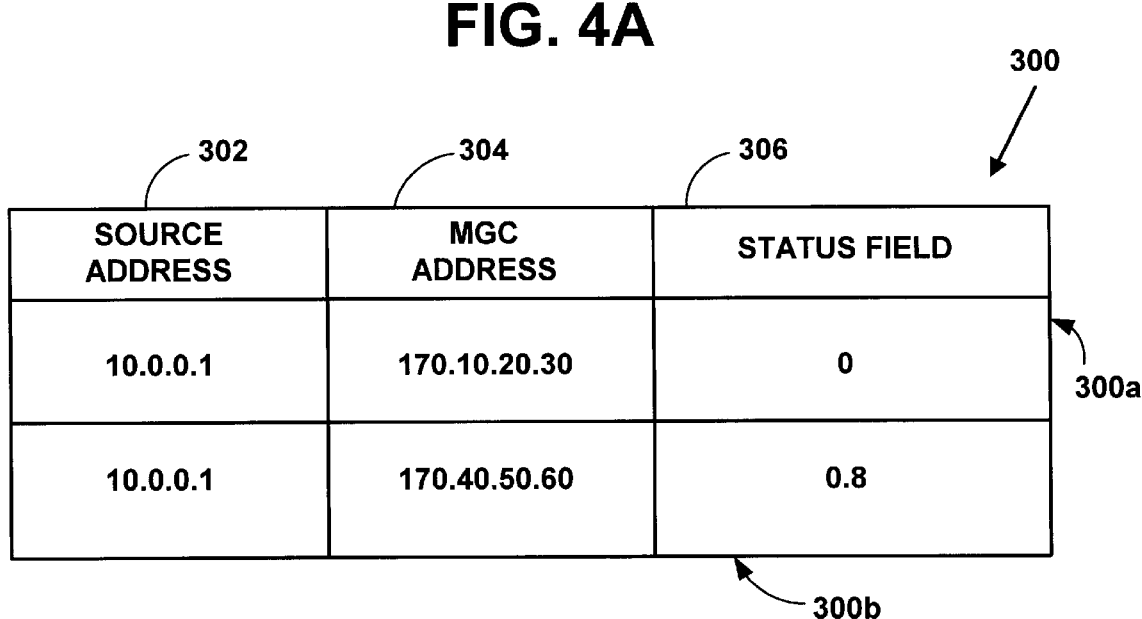
FIG. 4A is a preferred embodiment of an MCG list for the load balancing system and method of the present invention.

FIG. 4A shows a preferred format of the MGC list 300 suitable for use with the load balancing system and methods of the present invention. The MGC list 300 preferably has a plurality of rows 300a, also referred to herein as entries, with one row 300a or entry for each candidate egress MGC (i.e., MGC 50a, 50b). The MGC list 300 also preferably has a plurality of columns 300b. The preferred columns 300b comprise a source address field 302 for storing the IP address of the IP call source (i.e., the ingress MG 40, its MGC 42, or the second media device 22), an MGC address field 304 for storing the IP address of a candidate egress MGC (i.e., MGC 50a, 50b), and a status field 306 for storing a cost value assigned by each egress MGC recipient of the MGC list 300. For illustrative purposes, an IP address of 10.0.0.1 is used for the second media device 22 in the source address field 302 shown in FIG. 4A, and IP addresses of 170.10.20.30 and 170.40.50.60 are used for the MGC 50a and the MGC 50b, respectively, in the MGC address field 304 shown in FIG. 4A.

As discussed above, the status field 306 is initially set to a minimum cost value, such as zero, to indicate that the egress MGC has not seen the MGC list 300 before. Once an egress MGC has seen the MGC list before, however, then the status field 306 is preferably set to the assigned cost value. In FIG. 4A, a cost value of zero and 0.8 are assigned to the candidate egress MGCs 50a and 50b, respectively, thereby indicating that the MGC 50a has not seen the request before, but that the MGC 50b has seen the request before. It should be understood that the MGC list 300 may have other formats and additional fields, and the present invention should not be limited to the illustrative format and fields set forth herein.

Figure 4B:
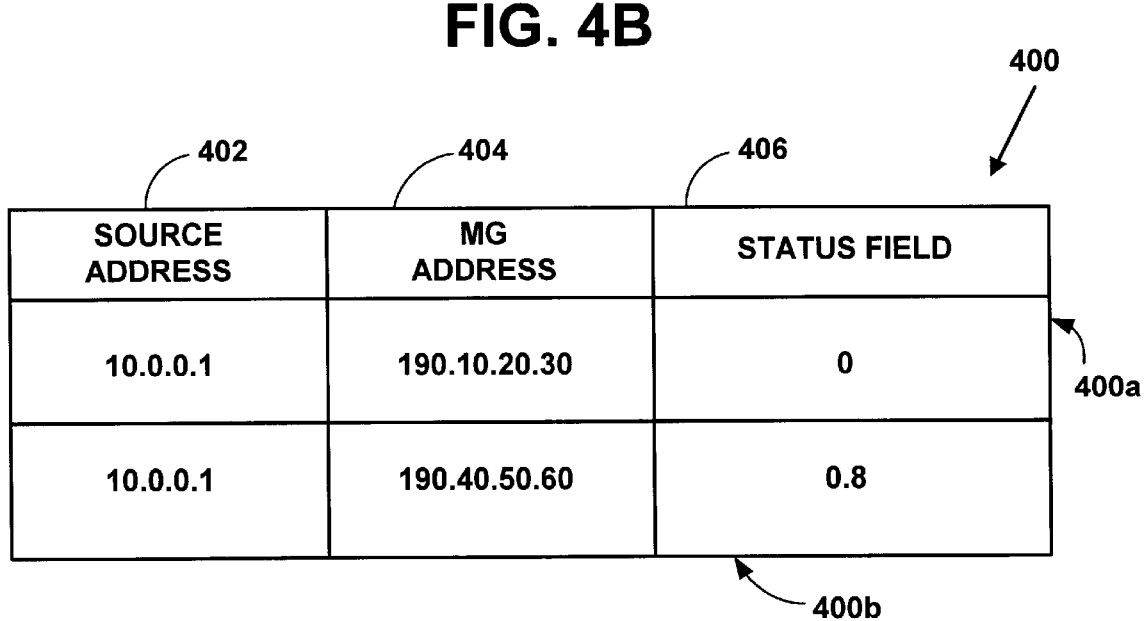
FIG. 4B is a preferred embodiment of an MG list for the load balancing system and method of the present invention.

FIG. 4B shows a preferred format of the MG list 400 suitable for use with the load balancing system and methods of the present invention. The MG list 400 preferably has a plurality of rows 400a, also referred to herein as entries, with one row 400a or entry for each candidate egress MG (i.e., MG 52a, 52b, 52c, 54a, 54b, 54c). The MG list 400 also preferably has a plurality of columns 400b. The preferred columns 400b comprise a source address field 402 for storing the IP address of the IP call source (i.e., the ingress MG 40, its MGC 42, or the second media device 22), a MG address field 404 for storing the IP address of a candidate egress MG (i.e., MG 52a, 52b, 52c, 54a, 54b, 54c), and a status field 406 for storing a cost value assigned by each egress MG recipient of the MG list 400. For illustrative purposes, an IP addresses of 10.0.0.1 is used for the second media device 22 in the source address field 402 shown in FIG. 4B, and IP addresses of 190.10.20.30 and 190.40.50.60 are used for the MG 52a and the MG 54a, respectively, in the MG address field 404 shown in FIG. 4B.

As discussed above, the status field 406 is initially set to a minimum cost value, such as zero, to indicate that the egress MG has not seen the MG list 400 before. Once an egress MG has seen the MG list before, however, then the status field 406 is preferably set to the assigned cost value.

In FIG. 4B, a cost value of zero and 0.8 are assigned to the candidate egress MGs 52a and 54a, respectively, thereby indicating that the MG 52a has not seen the request before, but that the MG 54a has seen the request before. It should be understood that the MG list 400 may have other formats and additional fields, and the present invention should not be limited to the illustrative format and fields set forth herein.

Figure 5:
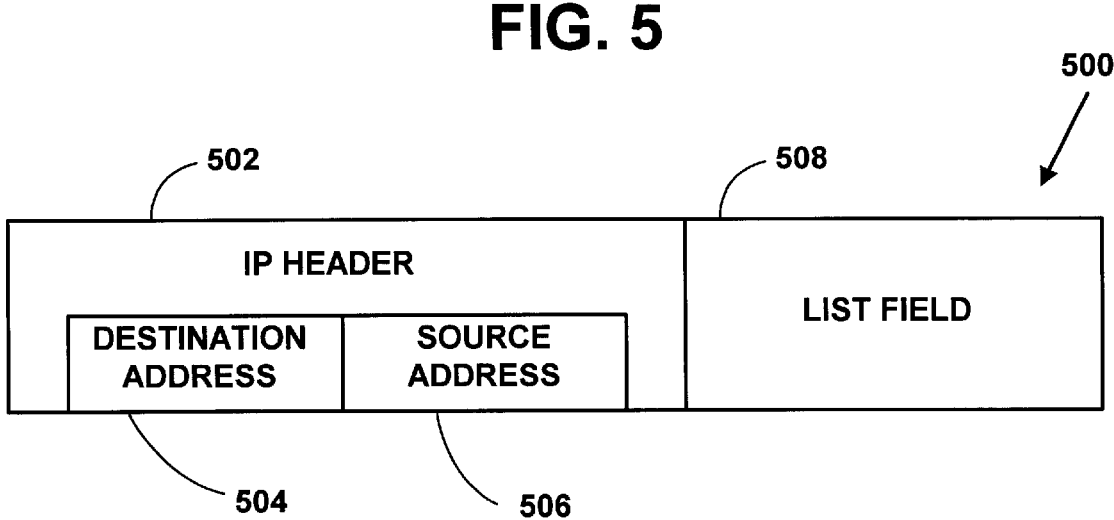
FIG. 5 is an exemplary embodiment of a request for the load balancing system and method of the present invention.

FIG. 5 shows an exemplary format of the request 500 suitable for use with the load balancing system and methods of the present invention. The request 500 comprises an IP header 502. IP headers contain routing information, such as destination and source IP addresses, and are well known in the art. As shown in FIG. 5, the IP header 502 comprises at least a destination address field 504 and a source address field 506. The destination address field 504 preferably, but not necessarily, contains the IP address of the next candidate egress MGC or MG on the MGC list 300 or the MG list 400, respectively. The source address field 506 preferably, but not necessarily, contains the IP address of the IP media source (i.e., the ingress MG 40, its MGC 42, or the second media device 22) or the previous candidate egress MGC or MG. The request 500 also comprises a list field 508, which contains either the MGC list 300 or the MG list 400, depending on the method being implemented. It should be understood that the request 500 may have other formats and additional fields, and the present invention should not be limited to the illustrative format and fields set forth herein.

The various embodiments of the load balancing system and methods of the present invention described above offer several advantages over the prior art. For instance, the system and methods of the present invention achieve load balancing among egress MGs, such as ITGs, without resorting to centralized control or the attendant need for centralized port management and state maintenance. As a result, calls can be distributed roughly uniformly, or in accordance with a specified distribution plan, among available egress MGs to preserve MG resources and optimize overall system performance. In addition, traffic bottle necks are avoided with the system and methods of the present invention by distributing the load balancing without resorting to centralized control and maintenance.

Those skilled in the art to which the invention pertains may make modifications and other embodiments employing the principles of this invention without departing from its spirit or essential characteristics, particularly upon considering the foregoing teachings. As an example, formats other than those described herein may be used for the first and second decision algorithms, depending on user and network preferences, and the present invention should not be limited to the presently described illustrative formats for these decision algorithms. For instance, each of the second decision algorithms, which are tools for introducing policy, may be uniform or biased, depending on user and network preferences, and may also be modified to include consideration of usage of other system resources, besides or instead of physical MG ports. In addition, the randomization step (i.e., Steps 116 and 216) at the beginning of each first decision algorithm (used for a non-prioritized list) could be modified to bias a particular search order as another way to introduce a form of prioritization in search order.

Also, both versions of second decision algorithms described above specify that a candidate removes itself from the list either if the cost value of rejection is infinite, or if the second pass through the list results in rejection. It should be noted that the load balancing methods of the present invention could be modified so that multiple passes through the list are allowed, as long as the cost value of rejection is not infinite. That is, a candidate that rejects a request, and thus a call, with a non-infinite cost value would remove itself from the list only if the number of times it has previously rejected the request is greater than some threshold, where the threshold can be greater than two. In this arrangement, the second decision algorithms could also be modified to account for the number of times the current candidate has previously rejected the call request.

Accordingly, the described embodiments are to be considered in all respects only as illustrative and not restrictive. The scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A method for load balancing among gateway devices comprising the steps of:
    obtaining a list of a plurality of gateway devices;
    sending a request to a first gateway device on the list;
    determining whether the first gateway device has an available port;
    removing the first gateway device from the list if the first gateway device does not have an available port;
    sending the request to a second gateway device on the list if the first gateway device does not have an available port;
    determining whether the request should be accepted by the first gateway device if the first gateway device has an available port;
    selecting the available port of the first gateway device if the request is accepted; and
    sending the request to a second gateway device on the list if the request is not accepted by the first gateway device.

2. The method of claim 1 further comprising the step of completing a call between a first network and a second network using the available port of the first gateway device that is selected if the request is accepted.

3. The method of claim 2 wherein the first network uses Internet Protocol packets, and the second network is the Public Switched Telephone Network.

4. The method of claim 1 further comprising the step of randomizing the list before the request is sent to the first gateway device.

5. The method of claim 1 further comprising the step of sending an error message if there are no gateway devices on the list.

6. The method of claim 1 further comprising the step of assigning a cost value to the first gateway device if the request is not accepted by the first gateway device.

7. The method of claim 6 further comprising the steps of removing the first gateway device from the list and sending the request to a second gateway device on the list if the cost value assigned to the first gateway is infinite.

8. The method of claim 6 further comprising the step of arranging the first gateway device in the list according to the cost value assigned to the first gateway device.

9. The method of claim 1 further comprising the steps of removing the first gateway device from the list and sending the request to a second gateway device on the list if the first gateway device has received the request more than once.

10. The method of claim 1 wherein the first and second gateway devices are media gateway controllers, each media gateway controller having under its control at least one media gateway, each media gateway having at least one port.

11. The method of claim 1 wherein the first and second gateway devices are media gateways, each media gateway having at least one port.

12. A method for load balancing among gateway devices used to complete calls between a first network and a second network, comprising the steps of:
   obtaining a list of a plurality of gateway devices that are candidates for completing a call between the first and second networks;
   sending a request to a first gateway device on the list, the request including the list;
   determining whether the first gateway device has an available port to complete the call;
   removing the first gateway device from the list if the first gateway device does not have an available port;
   sending the request to a second gateway device on the list if the first gateway device does not have an available port;
   determining whether the request should be accepted by the first gateway device if the first gateway device has an available port;
   selecting the available port of the first gateway device if the request is accepted;
   completing the call using the available port of the first gateway device if the request is accepted;
   assigning a cost value for completing the call to the first gateway device if the request is not accepted by the first gateway device; and
   sending the request to a second gateway device on the list if the request is not accepted by the first gateway device.

13. The method of claim 12 wherein the first network uses Internet Protocol packets, and the second network is the Public Switched Telephone Network.

14. The method of claim 12 further comprising the step of randomizing the list before the request is sent to the first gateway device.

15. The method of claim 12 further comprising the step of sending an error message if there are no gateway devices on the list.

16. The method of claim 12 further comprising the steps of removing the first gateway device from the list and sending the request to a second gateway device on the list if the cost value assigned to the first gateway is infinite.

17. The method of claim 12 further comprising the step of arranging the first gateway device in the list according to the cost value assigned to the first gateway device.

18. The method of claim 12 further comprising the steps of removing the first gateway device from the list and sending the request to a second gateway device on the list if the first gateway device has received the request more than once.

19. The method of claim 12 wherein the first and second gateway devices are media gateway controllers, each media gateway controller having under its control at least one media gateway, each media gateway having at least one port.

20. The method of claim 12 wherein the first and second gateway devices are media gateways, each media gateway having at least one port.

21. A system for balancing the load among gateway devices comprising:
   a list of a plurality of gateway devices that are candidates for completing a call between a first and a second network, the list being randomized;
   a first gateway device positioned first on the list, the first gateway device being in communication with the first and second networks, the first gateway device also having at least one port;
   a second gateway device positioned second on the list, the second gateway device being in communication with the first and second networks the second gateway device also having at least one port;
   a request including the list, the request capable of being sent to the first and second gateway devices;
   a first decision algorithm to determine whether the first gateway device has an available port to complete the call; and
   a second decision algorithm to determine whether the request should be accepted by the first gateway device if the first gateway device has an available port.

22. A system for balancing the load among gateway devices comprising:
   a list of a plurality of gateway devices that are candidates for completing a call between a first and a second network;
   a first gateway device positioned first on the list, the first gateway device being in communication with the first and second networks, the first gateway device also having at least one port;
   a second gateway device positioned second on the list, the second gateway device being in communication with the first and second networks, the second gateway device also having at least one port;
   a request including the list, the request capable of being sent to the first and second gateway devices;
   a first decision algorithm to determine whether the first gateway device has an available port to complete the call;
   a second decision algorithm to determine whether the request should be accepted by the first gateway device if the first gateway device has an available port; and
   an error message to indicate that there are no gateway devices on the list.

23. A system for balancing the load among gateway devices comprising:
   a list of a plurality of gateway devices that are candidates for completing a call between a first and a second network;
   a first gateway device positioned first on the list, the first gateway device being in communication with the first and second networks, the first gateway device also having at least one port;
   a second gateway device positioned second on the list, the second gateway device being in communication with the first and second networks, the second gateway device also having at least one port;
   a request including the list, the request capable of being sent to the first and second gateway devices;
   a first decision algorithm to determine whether the first gateway device has an available port to complete the call;
   a second decision algorithm to determine whether the request should be accepted by the first gateway device if the first gateway device has an available port; and
   a cost value assigned to the first gateway device if the request is not accepted by the first gateway device.

24. The system of claim 23 wherein the first gateway device is repositioned on the list according to the cost value assigned to the first gateway device.

25. A system for balancing the load among gateway devices comprising:
- a list of a plurality of gateway devices that are candidates for completing a call between a first and a second network;
- a first gateway device positioned first on the list, the first gateway device being in communication with the first and second networks, the first gateway device also having at least one port;
- a second gateway device positioned second on the list, the second gateway device being in communication with the first and second networks, the second gateway device also having at least one port;
- a request including the list, the request capable of being sent to the first and second gateway devices;
- a first decision algorithm to determine whether the first gateway device has an available port to complete the call; and
- a second decision algorithm to determine whether the request should be accepted by the first gateway device if the first gateway device has an available port;
- wherein the first and second gateway devices are media gateway controllers, each media gateway controller having under its control at least one media gateway, each media gateway having at least one port.

26. A system for balancing the load among gateway devices comprising:
- a list of a plurality of gateway devices that are candidates for completing a call between a first and a second network;
- a first gateway device positioned first on the list, the first gateway device being in communication with the first and second networks, the first gateway device also having at least one port;
- a second gateway device positioned second on the list, the second gateway device being in communication with the first and second networks, the second gateway device also having at least one port;
- a request including the list, the request capable of being sent to the first and second gateway devices;
- a first decision algorithm to determine whether the first gateway device has an available port to complete the call; and
- a second decision algorithm to determine whether the request should be accepted by the first gateway device if the first gateway device has an available port;
- wherein the second decision algorithm is a tool for introducing policy.

* * * * *